Sept. 19, 1967  J. C. SIMONTON  3,342,458
ADJUSTABLE VISION AND BREEZE BARRIER PANEL
Filed Sept. 7, 1965  2 Sheets-Sheet 1
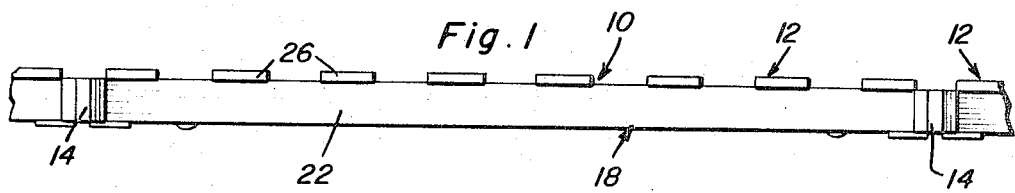
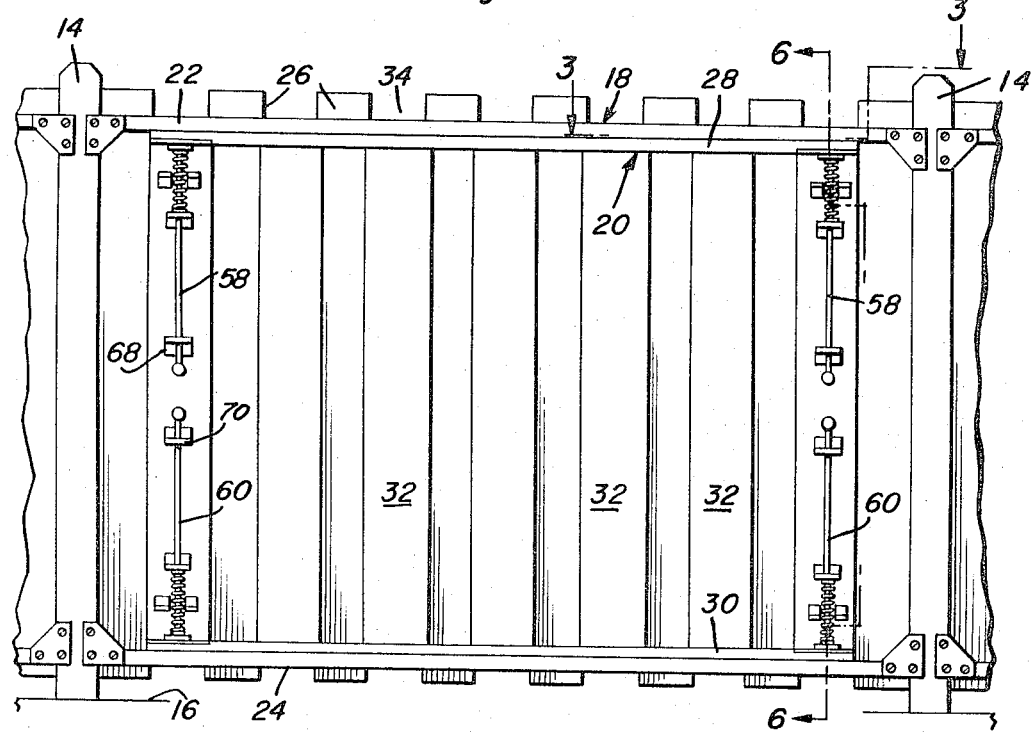
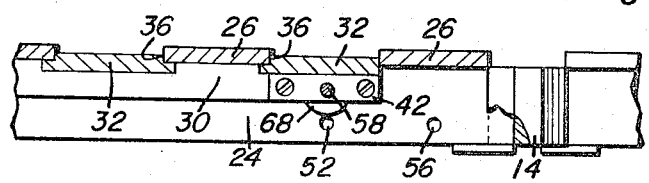
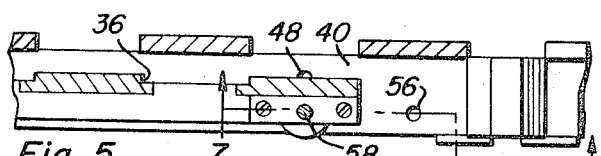
James C. Simonton
INVENTOR.

Sept. 19, 1967  J. C. SIMONTON  3,342,458
ADJUSTABLE VISION AND BREEZE BARRIER PANEL
Filed Sept. 7, 1965  2 Sheets-Sheet 2
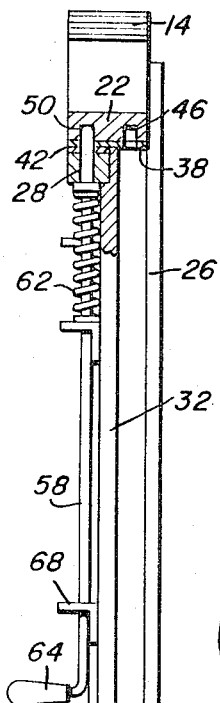
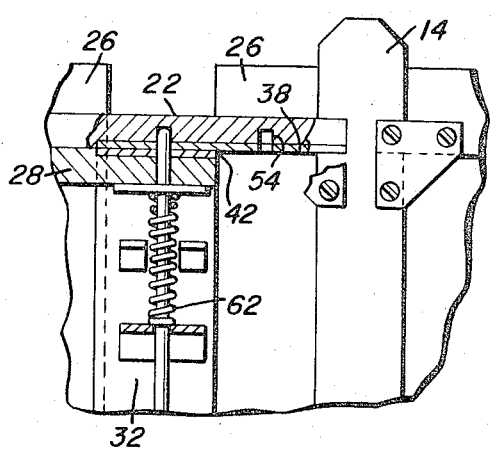
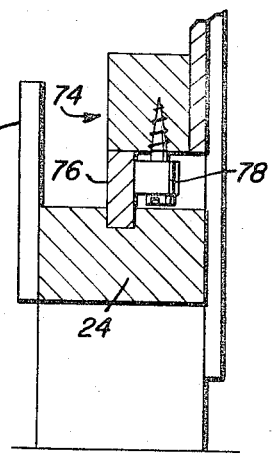
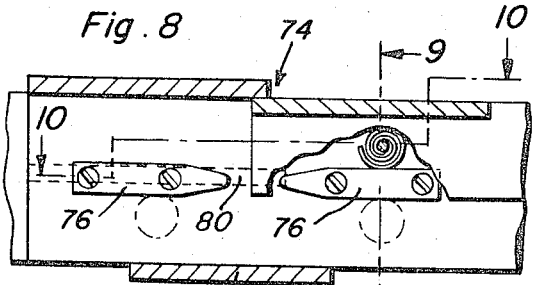
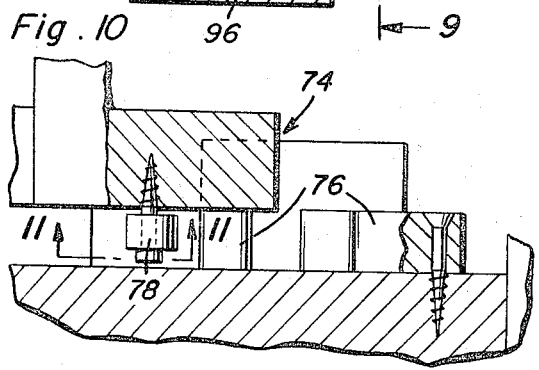
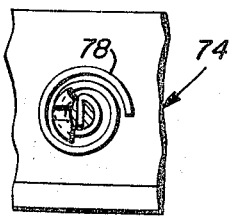
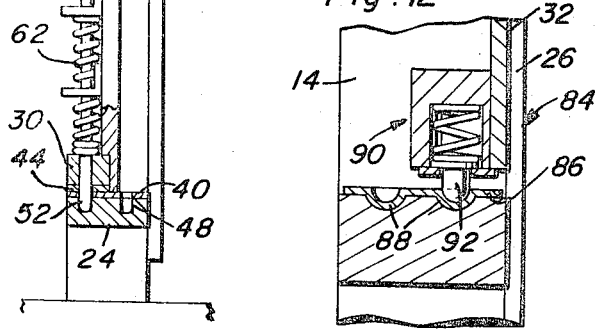
James C. Simonton
INVENTOR.

United States Patent Office 3,342,458
Patented Sept. 19, 1967

3,342,458
ADJUSTABLE VISION AND BREEZE
BARRIER PANEL
James C. Simonton, Star Rte., Box 105,
Forest Grove, Oreg. 97116
Filed Sept. 7, 1965, Ser. No. 485,245
7 Claims. (Cl. 256—24)

ABSTRACT OF THE DISCLOSURE

A pair of side-by-side sections with each section including transversely spaced and aligned elongated panel members interconnected at corresponding sets of end portions with one of the sections supported from the other section for movement toward and away from the latter and also movement of the first section between positions with the panel members thereof transversely aligned with the panel members of the other section and with the panel members thereof transversely aligned with the spacing between the panel members of the other section.

---

This invention relates to a novel and useful vision and breeze barrier panel and more specifically to a fence-like assembly including upstanding first and second sections each including a plurality of generally parallel and laterally spaced upstanding panel-like barrier elements interconnected at corresponding upper and lower end portions. The first and second sections of the assembly have the panel-like barrier elements thereof spaced apart equally and distances generally corresponding to the width of each upstanding panel-like barrier element.

The first and second sections of each assembly are laterally registrable with the corresponding panel-like barrier elements of the other section when the sections are disposed in side-by-side relation. The sections are supported from each other for longitudinal movement of the sections relative to each other and also for lateral movement of the sections relative to each other. In this manner, the sections may be disposed in side-by-side juxtaposed relation with the panel-like barrier elements registered with each other. When the sections are thus positioned wind may readily pass through the assembly by means of the spaces between corresponding pairs of adjacent panel-like barrier elements. In addition, the assembly does not provide a solid barrier and therefore a person on one side of the assembly may view the area disposed on the other side of the assembly.

By moving one section longitudinally relative to the other section the panel-like barrier elements of the sections may be moved out of registry with each other and into registry with the spaces between the adjacent panel-like barrier elements of the other section. When the barrier elements are thus disposed out of registry and the sections are disposed in juxtaposed relation relative to each other, the slots of one section defined between adjacent barrier-like elements are blocked by the barrier-like elements of the other section and vice versa and accordingly, the assembly then defines a substantially complete barrier to the passage of air and light therethrough. However, should the sections then be moved laterally apart without longitudinal movement, the movement of air through the assembly is afforded although a substantial barrier to the passage of light through the assembly is provided.

Accordingly, the barrier panel assembly of the instant invention is constructed whereby it may be utilized as only a partial barrier to the passage of light and air therethrough, a substantial barrier to the passage of light and air therethrough, and as a partial barrier to the passage of air therethrough and a substantial barrier to the passage of light therethrough.

The main object of this invention is to provide a barrier panel assembly of the aforementioned type that may be readily utilized in the construction of yard fences and the like. Although the barrier panel assembly of the instant invention has been specifically designed for use as a yard or patio fence, it is to be noted that its operation may also be equally as effective in different environments. Still further, although the panel-like barrier elements of the instant invention are illustrated and described herein as being substantially vertically disposed and the sections of each panel assembly are horizontally movable relative to each other, the inverse could be true with the panel-like barrier elements being horizontally disposed and vertically spaced relative to each other and the sections being vertically movable relative to each other.

Another object of this invention is to provide a barrier panel assembly in accordance with the preceding object and including means by which the lateral and longitudinally shiftable sections of the panel assembly may be secured in adjusted shifted positions relative to each other.

A further object of this invention, in accordance with the immediately preceding object, is to provide a barrier panel assembly including several different means for retaining the shiftable sections of the panel assembly in adjusted positions relative to each other.

A final object of this invention to be specifically enumerated herein is to provide an adjustable vision and breeze barrier panel assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of a fence-like structure constructed in accordance with the present invention;

FIGURE 2 is a side elevational view of the assemblage illustrated in FIG. 1;

FIGURE 3 is a fragmentary horizontal sectional view taken substantially upon the plane indicated by the section line 3—3 of FIG. 2 and on somewhat of an enlarged scale;

FIGURES 4 and 5 are fragmentary horizontal sectional views similar to FIG. 3 but illustrating the adjacent sections of the panel assembly in alternate positions relative to each other;

FIGURE 6 is an enlarged vertical sectional view taken substantially upon the plane indicated by the section line 6—6 of FIG. 2;

FIGURE 7 is a fragmentary enlarged vertical sectional view taken substantially upon the plane indicated by the section line 7—7 of FIG. 4;

FIGURE 8 is a fragmentary enlarged horizontal sectional view of a modified form of panel assembly and illustrating the manner in which the sections of the modified assembly are mounted for movement between predetermined positions relative to each other;

FIGURES 9 and 10 are fragmentary transverse sectional views taken substantially upon the planes designated by the section lines 9—9 and 10—10, respectively, of FIGURE 8;

FIGURE 11 is a fragmentary enlarged horizontal sectional view taken substantially upon the plane designated by the section line 11—11 of FIGURE 10; and FIGURE 12 is a fragmentary vertical transverse sectional view similar to FIGURE 9 illustrating a modified form of the invention.

Referring now more specifically to the drawings, the numeral 10 generally designates a yard or patio-type fense construction including a plurality of adjustable vision and breeze barrier panel assemblies generally referred to by the reference numerals 12 and arranged in end aligned and abutting relation in order to form the fence construction 10.

A post member 14 is disposed between and supports the adjacent ends of pairs of adjacent assemblies 12. The posts 14 may be of conventional design and supported from the ground 16 in any convenient manner such as by embedding the lower ends of the posts 14 in the ground 16.

Each assembly 12 includes a first section generally referred to by the reference numeral 18 and a second section generally referred to by the reference numeral 20. The section 18 includes a pair of upper and lower horizontal members 22 and 24 which are disposed in vertically spaced generally parallel relation and have their corresponding ends secured to the adjacent posts 14 in any convenient manner. A plurality of upstanding, laterally spaced and panel-like barrier elements 26, and which may be in the form of boards, are secured to the upper and lower members 22 and 24 in any convenient manner and with the spacing between adjacent element 26 substantiaaly equaling the width of the elements 26.

It will be noted that the preceding description of the fence assembly 10 may be said to be conventional as the usual form of picket fence includes all of the previously set forth structural elements. Accordingly, as will be hereinafter more fully set forth, it may be seen that a conventional picket fence may be readily modified in accordance with the present invention in order to provide an adjustable vision and breeze barrier panel assembly such as that illustrated and described herein.

The second section 20 also includes a pair of upper and lower horizontal members 28 and 30 interconnected by means of a plurality of laterally spaced and upright panel-like barrier elements 32. The elements 32 may be secured to the upper and lower members 28 and 30 in any conventional manner and it may be seen from FIGS. 2 and 3 of the drawings that the upper and lower members 28 and 30 are received between the upper and lower members 22 and 24. Still further, the elements 26 of each section 18 are secured to the same corresponding sides of the upper and lower members 22 and 24. The elements 32 of the section 20 are also secured to the same corresponding sides of the upper and lower members 28 and 30. Therefore, it may be seen that the outer faces of the elements 32 may be disposed in surface to surface contacting relation with the inner faces of the elements 26 disposed between the upper and lower members 22 and 24.

Further, from FIGS. 3–5 of the drawings, it may be seen that the elements 32 each has a width greater than the corresponding slot 34 defined between adjacent elements 26 and that the outer vertical edge portions of the elements 32 are rabbeted as at 36 so as to provide a tight joint between the elements 26 and 32 when the latter are positioned so as to be in registry with the slots 34 and in contacting relation with the inner surfaces of the elements 26 as shown in FIG. 3.

As can be best seen from a comparison of FIGS. 3, 6 and 7, the confronting surfaces of the members 22 and 24 have wear plates 38 and 40 recessed therein with the wear plates 38 and 40 secured to the members 22 and 24 in any convenient manner. In addition, the upper and lower surfaces of the members 28 and 30 have coacting wear plates 42 and 44 recessed therein in a conventional manner. The plates 38 and 42 are positioned for sliding frictional engagement with each other as are the plates 40 and 44. The plate 38 in the member 22 and the plate 40 in the member 24 include means defining corresponding downwardly and upwardly opening bores or recesses 46 and 48, respectively, and also corresponding recesses 50 and 52 as well as corresponding recesses 54 and 56. These corresponding bores or recesses are provided at opposite ends of each section 18 and the opposite ends of each section 20 have a pair of vertically slidable locking rods 58 and 60 mounted thereon for longitudinal vertical reciprocation between the extended positions illustrated in FIGS. 6 and 7 of the drawings and retracted positions with the remote ends of the rods 58 and 60 withdrawn from the corresponding recesses or bores defined by the opposing portions of the section 18. The rods 58 and 60 are yieldingly urged toward extended positions by means of expansion springs 62 operatively associated therewith and include laterally directed and adjacent handle portions 64 and 66, respectively, at their adjacent end portions which may be grasped to manually shift the rods to retracted positions. In addition, it may be seen that corresponding handle portions 64 and 66 may be grasped by the hands of the operator of the barrier assembly 12 and squeezed together to simultaneously retract the rods of each movable section and utilize the handle portions to support the movable section while guiding it from one adjusted position to the other.

The free ends of the rods 58 and 60 are removably receivable in the bores 46 and 48 when the section 20 is positioned as illustrated in FIG. 3 of the drawings. In addition, the remote ends of the rods 58 and 60 are removably receivable in the bores 50 and 52 when the section 20 is positioned as illustrated in FIG. 4 of the drawings. Still further, the remote ends of the rods 58 and 60 are also removably receivable in the bores 54 and 56 when the section 20 is positioned as illustrated in FIG. 5 of the drawings.

It will of course be understood that when the section 20 is positioned as illustrated in FIG. 3 of the drawings the assembly 12 constitutes a complete barrier to the passage of air and light therethrough. In addition, when the section 20 is positioned as illustrated in FIG. 4 of the drawings the assembly 12 comprises a substantial barrier to the passage of light therethrough while allowing substantially free flow of air between the elements 26. Finally, when the section 20 is positioned as illustrated in FIG. 5 of the drawings, the assembly 12 allows both light and air to pass through the slots 34 defined between the elements 26.

It is also contemplated that the assembly 12 could be modified by the inclusion of a flexible pull member interconnecting the adjacent ends of shortened rods 58 and 60 and passing through the guides 68 and 70 which slidably guide the adjacent ends of the instant unshortened rods 58 and 60.

With attention now invited more specifically to FIGS. 8–10 of the drawings there will be seen a further modified form of assembly generally designated by the reference numeral 74 and which includes pairs of elongated guide members 76 secured to the confronting surfaces of the members 22 and 24. The guide members 76 may be secured to and recessed in the members 22 and 24 as illustrated in FIGS. 8 and 9 of the drawings and are utilized in lieu of the guide or bearing plates 38 and 40. In addition, upper and lower followers 78 in the form of coil springs are secured to the upper and lower surfaces of the members 28 and 30 and are disposed for sliding contacting relation with the guide members 76. The guide members 76 at each end portion of the members 22 and 24 are spaced apart and therefore define a gap 80 therebetween, see FIG. 8, through which the coil springs 78 may be passed when laterally shifting the section 20 relative to the section 18. It is believed quite obvious that the embodiment illustrated in FIGS. 8–11 may also be utilized to position the section 20 in preselected positions thereof relative to the section 18 illustrated in FIGS. 3–9 of the drawings.

In FIG. 12 of the drawings there may be seen a still further modified form of the invention generally designated by the reference numeral 84 and which includes wear or bearing plates 86 corresponding to the plates 38 and 40 and including recessed portions 88 in lieu of the bores 46, 48, 50, 52, 54 and 56 and combination wear plate and spring-urged detent assemblies generally referred to by the reference numerals 90 are utilized in lieu of the wear plates 42 and 44 and the rods 58 and 60. The detent elements 92 of the assemblies 90 will of course function in the same manner as the remote ends of the rods 58 and 60 and be operable to retain the section 20 in the three different positions thereof illustrated in FIGS. 3–5.

In the modified form of invention illustrated in FIGS. 8–10 the first sections 18 thereof are each provided with opposite end substantially vertically disposed guide plates 96 secured to and projecting downwardly and upwardly from the inner marginal edge portions of the upper and lower horizontal members 22 and 24 thereof, respectively. The guide plates 96, of course, serve to maintain the sections 20 of the species of FIGS. 8–10 from being further laterally separated from the corresponding sections 18 beyond the positions illustrated by the phantom lines in FIG. 8. In addition to being provided in the species of FIGS. 8–10, it is to be understood that similar guide plates may be used to advantage in the species of FIGS. 1–7 and 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable vision and breeze barrier panel assembly comprising first and second sections each of a plurality of generally parallel and laterally spaced panel-like barrier elements interconnected at corresponding opposite end portions, the barrier-like elements of said sections being arranged relative to each other in similar fashion, means supporting said second section from said first section with the barrier elements of said sections generally paralleling each other and said sections disposed in side-by-side relation, said means including means supporting said second section from said first section for relative lateral movement of said second section toward and away from said first section between portions closely adjacent and appreciably laterally spaced from said first section, respectively, as well as movement of said second section between a position with the barrier elements thereof transversely registered with the barrier elements of said first section and a position with the barrier elements thereof transversely registered with the spacing between adjacent barrier elements of the first section, portions of said assembly also serving to retain said second section in adjusted position relative to said first section.

2. The combination of claim 1 wherein said portions include means operable to releasably retain said sections in adjusted relative positions.

3. The combination of claim 2 wherein said means operable to releasably retain said sections in said adjusted positions includes means operative to positively lock said sections in said adjusted relative positions.

4. The combination of claim 2 wherein said means operable to releasably retain said sections in said adjusted positions includes means operative to positively lock said sections in said adjusted relative positions, said means operable to releasably retain said sections in adjusted relative positions defining means yieldingly resisting movement of said sections relative to each other from predetermined positions.

5. The combination of claim 1 wherein said portions include means operable to releasably retain said sections in adjusted relative positions, the last-mentioned means including coacting spring-urged detent and recess-defining means carried by said sections.

6. The combination of claim 1 wherein said portions include means operable to releasably retain said sections in adjusted relative positions, and the last-mentioned means including coacting portions of said sections supporting the weight of one of said sections from the other section and disposed in sliding contacting frictional engagement with each other.

7. The combination of claim 1 wherein said portions include means operable to releasably retain said sections in adjusted relative positions, and the last-mentioned means including retractable slide bolt means movably carried by one of said sections, the other of said sections including recess-defining means for receiving said slide bolt means when the latter is extended.

References Cited

UNITED STATES PATENTS

| 1,995,456 | 3/1935 | Kannel | 49—77 X |
| 2,250,059 | 7/1941 | Farney. | |
| 2,525,371 | 10/1950 | Reynolds | 98—41 |
| 2,576,848 | 11/1951 | Mercier et al. | 98—41 |
| 3,101,929 | 8/1963 | Dvore | 256—24 |

FOREIGN PATENTS

| 904,731 | 8/1962 | Great Britain. |
| 350,788 | 1/1961 | Switzerland. |

DAVID J. WILLIAMOWSKY, *Primary Examiner.*

HARRISON R. MOSELEY, *Examiner.*

D.L. TAYLOR, *Assistant Examiner.*